INVENTOR.
Shields Patrick Baker

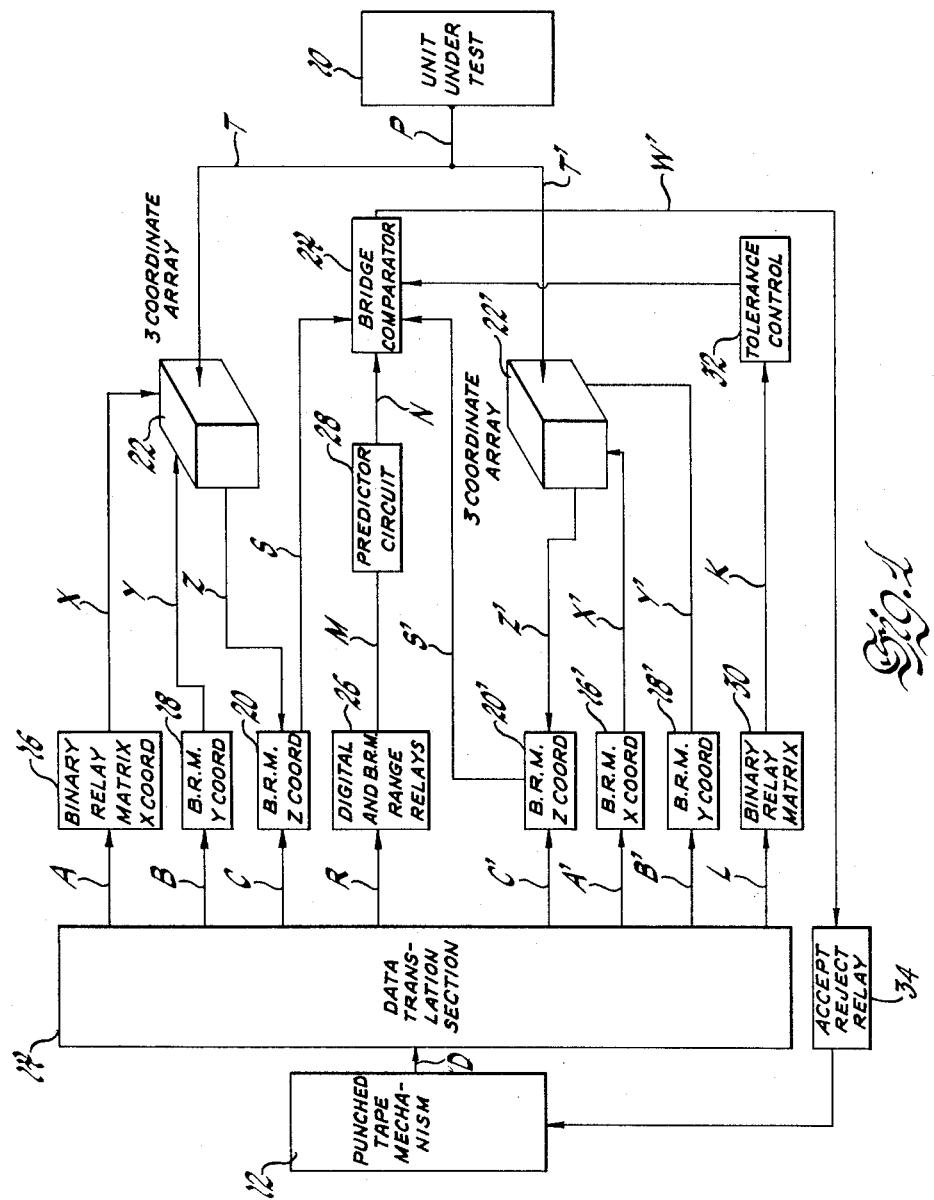

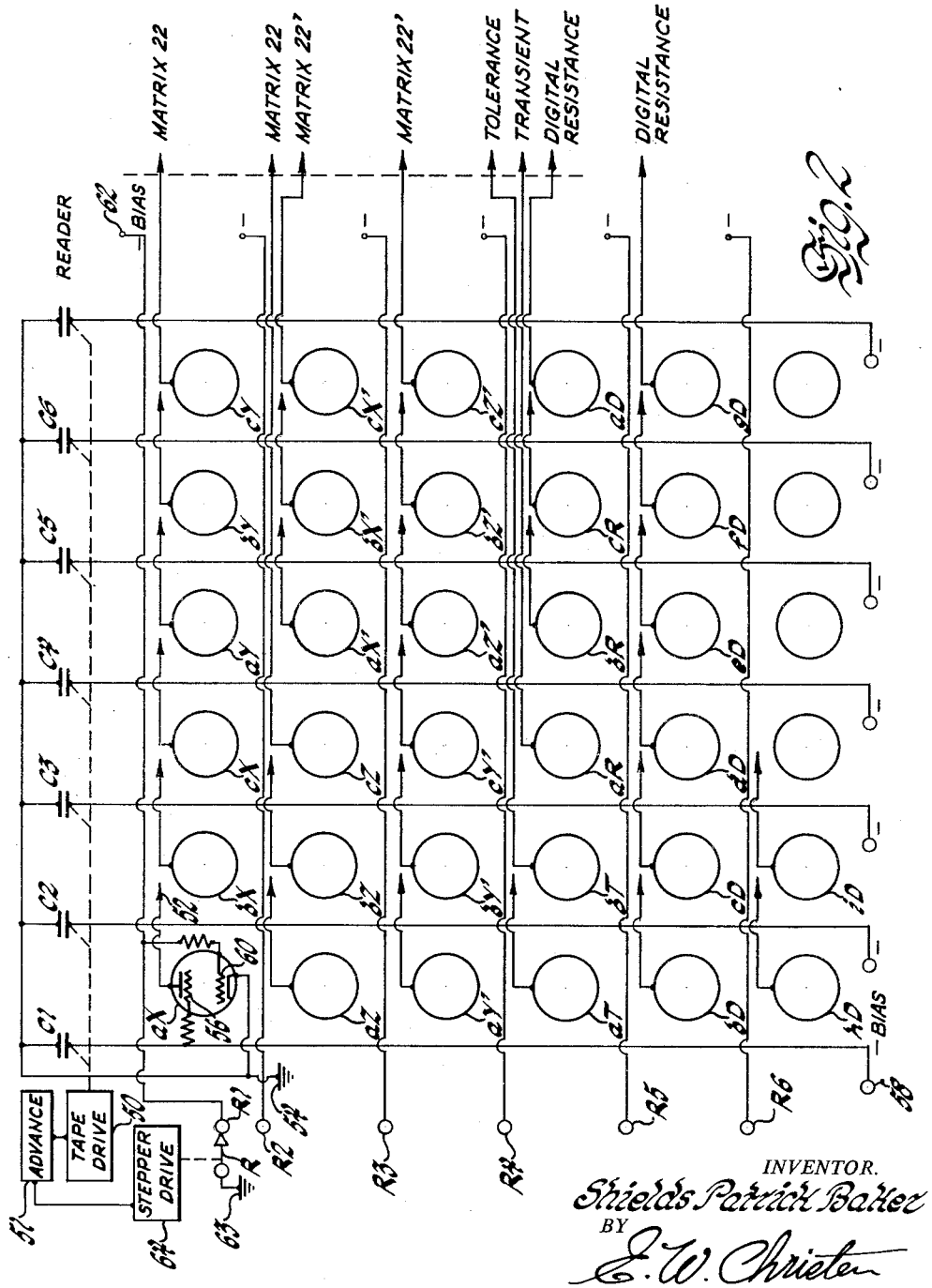

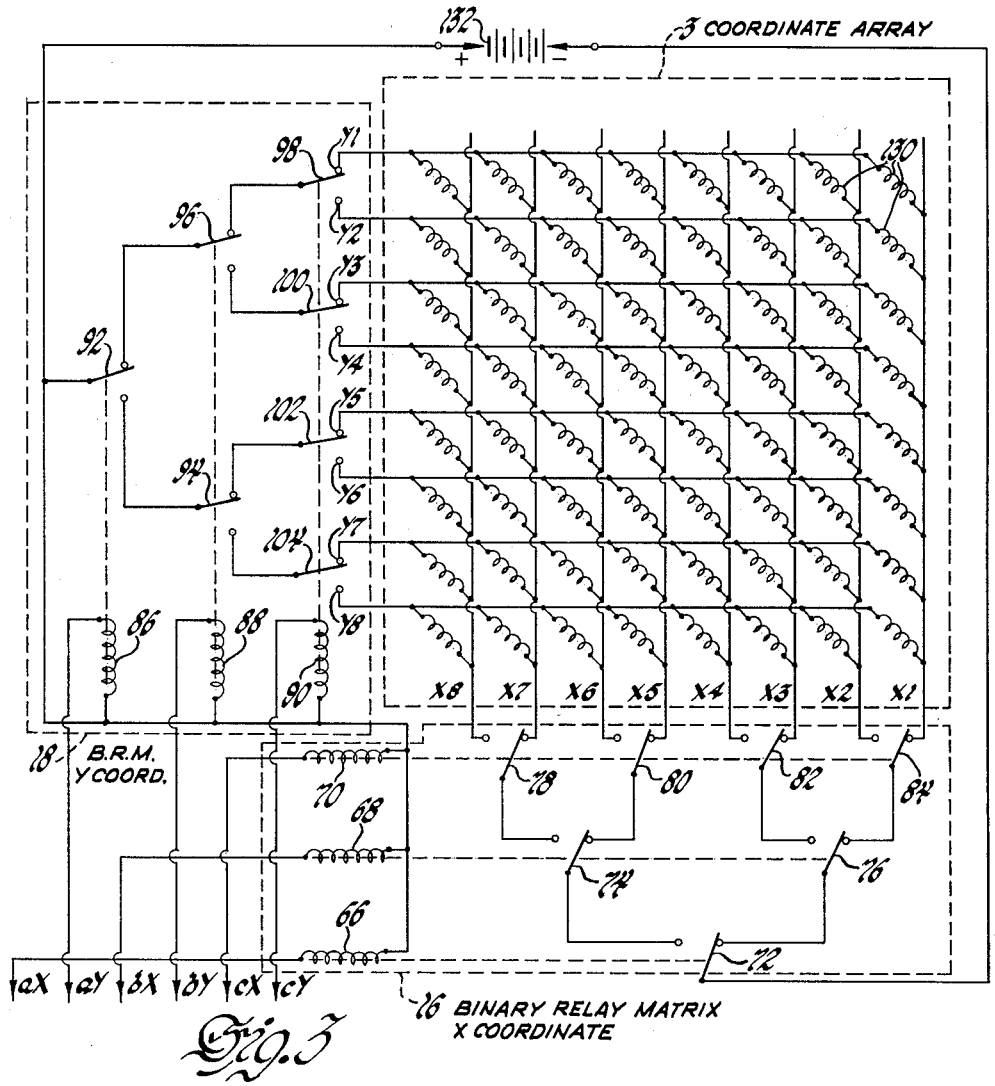

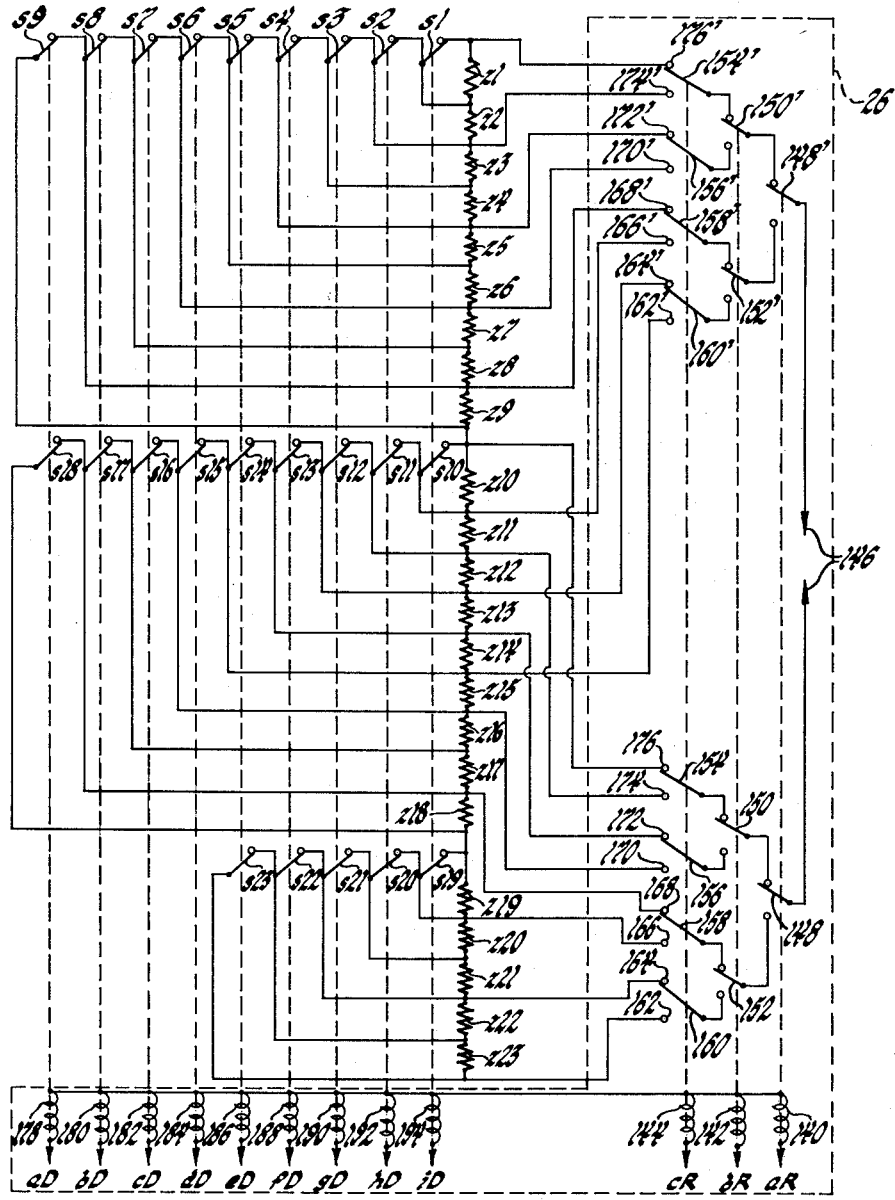

United States Patent Office 2,996,666
Patented Aug. 15, 1961

2,996,666
AUTOMATIC TEST APPARATUS
Shields Patrick Baker, Flint, Mich., assignor to General Motors Corporation, Detroit, Mich., a corporation of Delaware
Filed July 12, 1957, Ser. No. 671,465
5 Claims. (Cl. 324—73)

This invention relates to selective switching circuits and more particularly to such circuits for automatic test apparatus for electronic units.

In the manufacture and operational maintenance of electronic equipment of complex design, the equipment must be subjected to numerous electrical tests involving, in many cases, a multitude of circuit connections. The testing of electrical characteristics of many different circuits heretofore has been a time consuming process requiring skilled operators and complex equipment especially adapted to the particular equipment under test. In accordance with this invention, apparatus is provided which automatically performs the requisite tests with speed and accuracy regardless of the nature of the equipment.

In the manufacture and operational maintenance of provide special connections and adaptors depending upon the type of equipment being tested to permit the test apparatus to accommodate the equipment. This invention provides test apparatus which is universal in the sense that all types of electronic equipment to be tested are connected to the test apparatus in the same manner and the operation of the test apparatus is dictated by the test requirements of the particular electronic equipment being tested. This is accomplished by utilizing binary information techniques for supplying test procedure data. Thus, test data may be provided on a record medium such as punched tape for specifying the test procedure corresponding to each different type of equipment to be tested. Such test data may define the circuits to be tested and the electrical characteristics to be expected and additionally it may define the sequence of testing for multiple circuits.

To effect automatic performance of the testing procedure, binary data reader means is provided to control a selector for the test circuit connections. This is advantageously accomplished by utilizing binary circuit techniques including a three coordinate array of relays. Further advantage is realized by use of an interposed data translation unit for providing temporary data storage. The data translation means also controls the connection of a predictor unit to select the desired value of the electrical characteristic of the test circuit selected. The selected test circuit and the predictor unit are connected to a comparator circuit which responds to the electrical characteristic of the two circuits to signify disagreement thereof thus indicating the acceptability of the circuit being tested.

A more complete understanding of this invention may be had from the detailed description which follows taken with the accompanying drawings in which:

FIGURE 1 is a block diagram representative of the entire system;

FIGURE 2 is a schematic diagram of the data translation unit;

FIGURE 3 is a schematic diagram of a portion of the three coordinate array of relays and associated binary relays;

FIGURE 4 is a diagrammatic representation of the punched tape;

FIGURE 5 is a diagrammatic representation of the punched tape reader mechanism;

FIGURE 7 is a schematic diagram of the predictor unit.

Figure 6:
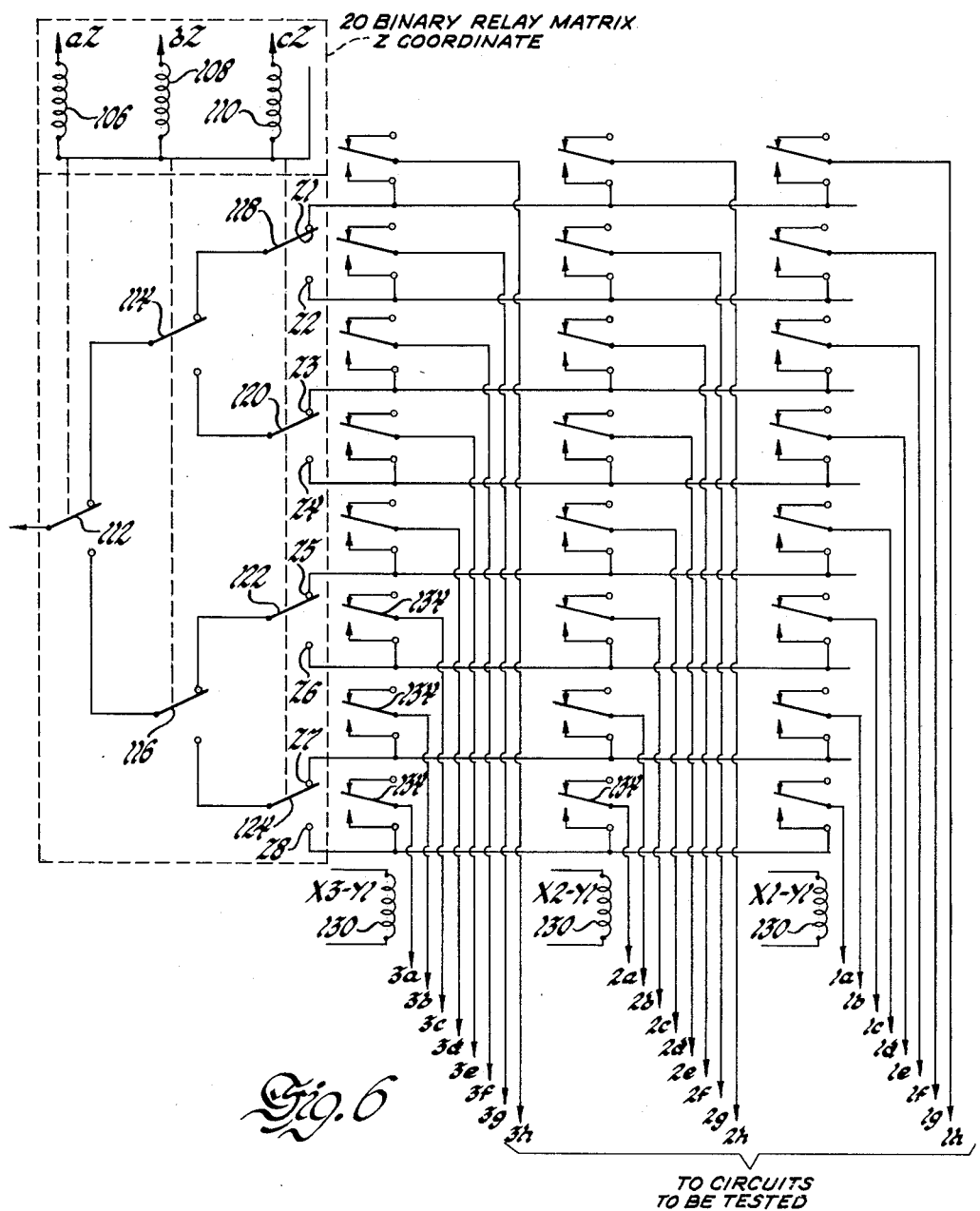
FIGURE 6 is a schematic diagram of the remainder of the three coordinate array of relays and associated binary relay.

Referring now to the drawings there is shown an illustrative embodiment of the invention in automatic test apparatus for electronic units having a multiplicity of test points and requiring the sequential connection of different pairs of test points as a test circuit, an electrical characteristic of which is to be ascertained. In general, the electronic unit 10 to be tested may have any number of test points up to and including $2_{(m+n+p)}$ wherein $m$, $n$, and $p$ are integers representing the number of bits of information to be supplied for each respective coordinate of a three-coordinate system. In the specific example given for illustrative purposes $m=n=p=3$ and accordingly, the unit under test may have as many as $(2^n)^3$ or 512 different test points. This apparatus is capable of automatically connecting any one of the test points to any other of the test points thus affording a number of different test circuits given by the expression $(2^n)^6$, or in the specific example, in excess of 250,000 different test circuits. By means of the present invention, any one of the test circuits is defined by binary information requiring only $2 \times 3n$ binary information digits or bits or in the specific example, 18 binary bits of information. Accordingly, the binary information is supplied by a punched tape mechanism 12 to define the circuit to be selected and tested and binary information is supplied to define the desired electrical characteristic of the circuit selected for test. Additional binary information may define test conditions such as the acceptable tolerance of permissible deviation between the desired value and the actual value of the electrical characteristic of the circuit being tested. The information corresponding to the performance of one test procedure is transferred by conductor group D to the data translation section 14 in which the binary information is temporarily stored during the performance of the test defined thereby. From this data translation section, the data defining the circuit to be tested is supplied by conductor groups A, B, and C, having $n$ conductors each, to the X-coordinate binary relay 16, Y-coordinate binary relay 18, and Z-coordinate binary relay 20, respectively. Each of these binary relays is connected over conductor groups X, Y, and Z, of $2^n$ conductors each, to the three coordinate relay array 22 for the automatic selection of one terminal of $(2^n)^3$ different test circuit terminals. In the electronic equipment 10 being tested, which has as many as $(2^n)^3$ test points, each test point is connected through the conductor group P and conductor group T to one of the test circuit terminals of the three coordinate array. The selected one of the test terminals is connected through the Z-coordinate binary relay 20 and conductor S to the comparator circuit 24. In a similar manner, each of the X, Y, and Z-coordinate binary relays 16', 18', and 20' receives data from the data translation section 14 over conductor groups A', B', and C'. Each of these binary relays is in turn connected to its respective coordinate axis of the three coordinate relay array 22' over conductor groups X', Y', and Z'. The three coordinate array 22' is provided with $(2^n)^3$ test circuit terminals connected respectively through conductor group T' and P to the test points of the electronic unit 10. The selected one of the test circuit terminals of the three coordinate array 22' is connected through binary relay 20' and conductor S' to the comparator circuit 24. Thus the circuit extending between the two selected test points is connected to the comparator circuit 24. The binary information defining the desired value of the electrical characteristic for the selected circuit is stored in the data translation section and supplied by conductor group R to the digital and range relays 26 which, through conductor group M, controls the predictor circuit or digital resistance standard 28 which in turn is connected through conductor group N to the input of the comparator circuit 24. Additionally, the binary information recorded on the tape pertaining to test tolerances is stored in the translation section 14 and is supplied by conductor group L to the binary relay 30 which, through conductor group K, influences the tolerance control 32. The tolerance control regulates the operation of the comparator circuit 24. The comparator circuit 24 responds to the disagreement of the electrical characteristic of the selected test circuit and the electrical characteristic of the predictor circuit 28 to operate, through its output conductors W, a reject relay 34 which in turn is effective to disable the operation of the punched tape mechanism.

The apparatus will now be described in greater detail considering first the recorded data defining the tests to be performed. The punched tape mechanism 12 may be of any conventional type and suitably utilizes as a data recording medium a punched tape 40 as illustrated in FIGURE 4. The punched tape is provided with a large number of groups 42, 44, etc. of binary information each defining a different test procedure. Each information group, such as group 42, is suitably arranged in a matrix of 6 columns and 6 rows. Each binary bit of information is represented by the presence or absence of an aperture in the tape at the position corresponding to the intersection of each row and column, in a conventional manner. The tape 40 is supplied through a tape reading mechanism which may comprise a conductive drum 46 and a set of reader contacts 48. The contacts are disposed axially of the drum and hence transversely of the tape 40 in alignment with one row at a time of the binary information bits. In a well known manner, the tape is advanced relative to the contacts row by row and a conductive or insulating path occurs between each individual contact and drum depending upon the presence or absence of an aperture corresponding to each contact.

The tape reader mechanism, represented in block diagram together with a schematic of the data translation section in FIGURE 2, comprises a tape drive 50 controlled by a tape advance mechanism 51 and adapted to advance the tape 40 continuously past the reader contacts 48. The reader contacts 48 are shown individually and identified as C1, C2, C3, C4, C5, and C6 and are shown as normally open contacts operated by the tape drive 50. The data translation section 14 comprises an array of electron devices or tubes aX, bX, cX, aY, etc. which are disposed in plural rows and columns corresponding to the arrangement of the binary bits recorded on the tape 40. All of the electron devices, suitably gas tetrodes, are connected in similar fashion and only the connection of device aX will be described in detail. The device aX has an output circuit extending between its plate and cathode electrodes and the external circuit, to be subsequently, is connected between the plate terminal 52 and the ground terminal 54. The device aX is provided with a control electrode 56 connected to a bias voltage source 58 and is also provided with a control electrode 60 connected to a bias voltage source 62. All of the control electrodes 56 of the electron devices in the first column of the array are connected through the reader contact C1 to ground 54. Similarly, the corresponding control electrodes of the remaining electron devices in columns 2, 3, 4, 5, and 6 are connected respectively through reader contacts C2, C3, C4, C5, and C6 to ground 54. The control electrode 60 of each of the devices in the first row are connectible through the stepping switch fixed contact R1 and movable contact R to ground 63. Similarly, the control electrode 60 of each of the electron devices in rows 2, 3, 4, 5, and 6 are connected together and are connectible to ground through stepping switch contacts R2, R3, R4, R5, and R6, respectively, by movable contact R to ground 63. The movable contact R, controlled by the tape advance mechanism 51, is actuated by a stepper drive mechanism 64 to make sequential contact with contacts R1, R2, R3, R4, R5, and R6 in synchronism with the advancement of the tape 40 through the succeeding rows of binary information bits. The bias voltage sources 58 and 62 are of such value that each of the electron devices is normally non-conductive and becomes conductive only upon the removal of the bias voltage from both control electrode 56 and control electrode 60 simultaneously. Therefore, when the tape 40 is advanced to a position in which the reader contacts are aligned with the first row of binary information bits the movable contact R engages the fixed contact R1 and grounds the control electrode 60 of all of the electron devices in row 1, thus removing the bias voltage therefrom. At the same time, the reader contacts C1, C2, C3, C4, C5, and C6 are actuated in accordance with the binary information bits of row 1. For each of the reader contacts which is closed by the presence of an aperture in the tape, the control electrodes 56 of all of the electron devices in the corresponding column are connected to ground 54 and thus the bias voltage is removed therefrom. Upon such a coincidence of bias voltage removal for any given electron device, the device becomes conductive and the utilization device in the output circuit thereof is energized. The information recorded upon the tape 40 is thus transferred in binary form to the data translation section 14 and temporarily stored thereby for simultaneous presentation in its entirety to the circuit selector system to be described presently.

Automatic selection of one test point of the equipment 10 is effected in accordance with the binary information presented in row 1, columns 1 through 6, and row 2, columns 1, 2, and 3 of each information group on the punched tape. The circuit selector includes the three coordinate relay array 22 and the associated interposed X, Y, and Z-coordinate binary relays 16, 18, and 20. The X-coordinate binary relay 16, as shown in FIGURE 3, includes relays 66, 68, and 70 which are connected respectively in the output circuits of the electron devices aX, bX, and cX. Each output circuit extends from the plate electrode of the electron device through the associated relay to ground and thence to the cathode of the electron device and thus the relay is energized when the electron device is conductive. The relay 66 actuates the movable contact of a switch 72 between front and back fixed contacts. The relay 68 actuates the switches 74 and 76 having their movable contacts connected to the front and back fixed contacts respectively of the switch 72. The relay 70 actuates the movable contacts of the switches 78, 80, 82, and 84. The movable contacts of switches 78 and 80 are connected to the front and back fixed contacts respectively of the switch 74 and the movable contacts of switches 82 and 84 are connected to the front and back fixed contacts respectively of the switch 76. Thus, the switches just described are arranged in cascade fashion and in general include n relays with n banks of switch contacts so that a single input terminal of the switches may be connected selectively with any one of ($2^n$) output terminals. In the illustrative embodiment, the single X-coordinate input terminal corresponds to the movable contact of switch 72 which may be connected to any one of the fixed contacts X1, X2, X3, X4, X5, X6, X7, and X8 by selective energization of the relays 66, 68, and 70. This selective energization is performed in accordance with well-known binary logic whereby n different elements having two conditions each may be arranged in ($2^n$) different configurations.

The binary relay 18 corresponding to the Y-coordinate, also shown in FIGURE 3, includes relays 86, 88, and 90 which are connected respectively to the electron devices aY, bY, and cY, respectively, for energization thereby. The relay 86 actuates the movable contact of a switch 92. The relay 88 actuates the movable contacts of switches 94 and 96 which have the movable contacts connected to the front and back fixed contacts of the switch 92. The relay 90 actuates the switches 98, 100, 102, and 104 to displace the movable contact between front and back fixed contacts. The movable contacts of switches 98 and 100 are connected respectively to the front and back fixed contacts of switch 96 and the movable contacts of switches 102 and 104 are connected respectively to the front and back contacts of switch 94. Thus, the movable contact 92 may be connected to any one of the fixed contacts Y1, Y2, Y3, Y4, Y5, Y6, Y7, and Y8 by selective energization of the relays 86, 88, and 90.

The binary relay 20 corresponding to the Z-coordinate of the three coordinate array 22 comprises relays 106, 108, and 110 as shown in FIGURE 6. The relays 106, 108, and 110 are connected respectively in the output circuits of the electron devices $aZ$, $bZ$, and $cZ$ for energization thereby. The relay 106 actuates the switch 112 to displace the movable contact between front and back fixed contacts. The relay coil 108 actuates the switches 114 and 116 to displace the movable contacts, which are connected respectively to the front and back contacts of switch 112, between fixed front and back contacts. The relay 110 actuates the switches 118, 120, 122, and 124 to displace the respective movable contacts between fixed front and back contacts. The movable contacts of switches 118 and 120 are connected respectively to the fixed front and back contacts of switch 114 and the movable contacts of switches 122 and 124 are connected respectively to the fixed front and back contacts of switch 116. Thus, the movable contact of switch 112 may be connected to any one of the fixed contacts Z1, Z2, Z3, Z4, Z5, Z6, Z7, and Z8 by selective energization of the relays 106, 108, and 110.

By the utilization of the arrangement just described, it will be appreciated that each such binary relay permits the selection of any one of $(2^n)$ different circuits by the use of $n$ different circuits. At this point in the selector circuitry, a change in binary logic permits the selection of a very much larger number of circuits by the use of relatively few circuits. This is accomplished by the three coordinate relay array 22 whereby any one of $(2^n)^3$ circuits may be selected by 3 $(2^n)$ circuits. This three coordinate relay array is illustrated in FIGURES 3 and 6 and is controlled by the X, Y, and Z-coordinate binary relays 16, 18, and 20 just described.

The three coordinate relay array as shown in FIGURE 3 includes a plurality of individual relays 130 which in general are disposed in an array having $(2^n)$ relays in each column and $(2^n)$ relays in each row. It is to be understood that the actual physical disposition of the relays is of no moment and that the rows and columns refer to the electrical connections. For convenience in representation of the illustrative embodiment, the relays are shown in a square array with 8 in each column and 8 in each row utilizing a total of 64 relays. All of the relays 130 in each column have one terminal connected through a common conductor to a corresponding output terminal of the X-coordinate binary relay 16. Thus, all of the relays 130 in column 1 have one terminal connected to fixed contact X1, all of the relay coils in column 2 have one terminal connected to fixed contact X2, etc. In a similar fashion, all of the relays 130 in the same row have the other terminal connected through a common conductor to a corresponding output terminal of the Y-coordinate relay 18. Thus all of the relays in row 1 have the other terminal connected to fixed contact Y1, all of the relays in row 2 have the other terminal connected to fixed contact Y2, etc. A source of voltage 132 for energization of the relays 130 is connected between the movable contact of switch 92 and the movable contact of switch 72. It will be apparent that for the position of switches shown a circuit will be completed from one terminal of the voltage source 132 through switches 92, 96, and 98 to one terminal of the relay 130 in column 1, row 1, designated X1—Y1. This energizing circuit is completed from the other terminal of this relay through switches 84, 76, and 72 to the other terminal of the voltage source. It will also be apparent that for this unique switch condition no other one of the relays 130 will be energized. Any one of the relays 130 may be selectively energized by operation of the X-coordinate and Y-coordinate relays to change the switching condition to any one of the $(2^n)^2$ possible combinations.

The three coordinate relay array also includes, as shown in FIGURE 6, a switch stack corresponding to each of the relays 130 and including plural switches 134. In FIGURE 6, only three of such switch stacks are shown to illustrate the circuit connections. In general, the number of switches 134 is $(2^n)$ switches per stack arranged in $(2^n)^2$ different stacks and thus in the illustrative embodiment $(2^3)^3$ or 512 different switches are employed. Each switch stack is identified by its corresponding relay and thus the switch stacks illustrated are X1—Y1, X2—Y1, and X3—Y1. Each switch in a given stack is identified for convenience by its relative position or level in the stack which is termed herein the Z-coordinate. Each of the switches 134 in the Z1 level of all stacks has its front contact connected through a common conductor to the output terminal Z1 of the binary relay 20. Similarly, each of the switches 134 in the level Z2 of all stacks has its front contact connected through a common conductor to the output terminals Z2 of the binary relay 20 and similarly, the front contacts of all switches of remaining levels Z3, Z4, Z5, Z6, Z7, and Z8 are connected respectively to the output terminals Z3, Z4, Z5, Z6, Z7, and Z8 of the binary relay 20. Each movable contact of all switches 134 in all stacks of the array are terminated individually in test circuit terminals designated $1a$, $1b$, $1c$, etc., thus providing $(2^n)^3$ different test circuit terminals. Since all switches in any stack may be actuated by energization of the corresponding relay 130 for example, X2—Y1, by appropriate switching of the X and Y binary relays then any one of the corresponding movable contacts, for example $2a$, $2b$, $2c$, $2d$, $2e$, $2f$, $2g$, and $2h$, of that stack may be connected to the corresponding terminals Z1, Z2, Z3, Z4, Z5, Z6, Z7, and Z8 of the Z-coordinate binary relay 20. Any one of such terminals of binary relay 20 may be connected, by selective energization of the relays 106, 108, and 110, to the movable contact 112. Therefore, it becomes apparent that any one of the test circuit terminals $1a$, $1b$ . . . , $2a$, $2b$ . . . , etc. may be connected with the movable contact 112 by selective energization of the binary relays 16, 18, and 20.

The electronic equipment 10 being tested is connected to the test apparatus by individually connecting each test point of the equipment to a different test circuit terminal of the test apparatus. One test point of the equipment is thereby connected through the three coordinate relay array 22, the Z-coordinate binary relay 20, and thence through the conductor S to the comparator circuit 24. The other test point is selected in the same manner by a duplication of the selector circuitry just described. In particular, the second test point is defined on the punched tape 40 by the binary information bits appearing at row 2, columns 4, 5, and 6 and row 3, columns 1 through 6 of each information group. Accordingly, this information is transferred by the tape reader mechanism to the data translation section 14 and temporarily stored in the corresponding electron devices $aX'$, $bX'$, and $cX'$ which control the X-coordinate binary relay 18', electron devices $aY'$, $bY'$, and $cY'$ which control the Y-coordinate binary 18', and electron devices $aZ'$, $bZ'$ and $cZ'$ which control the Z-coordinate binary relay 20'. The binary relays 16', 18', and 20' are connected with the three coordinate relay array 22' and control the selection of one of the test circuit terminals thereof. Each test point of the equipment 10 under test is connected to a different one of the test circuit terminals of the three coordinate array 22'. Thus the test circuit terminal and the test point selected by binary relays and three coordinate array in accordance with the test information on the punched tape 40 is connected through the Z-coordinate binary relay 20' and thence through conductor S' to the other test circuit input terminal of the comparator circuit 24. In this condition, two individually selected test points of the equipment under test are connected to the test circuit input terminals of the comparator circuit 24 and it remains to ascertain the value of an electrical characteristic of the test circuit defined by these two test points.

The determination of the electrical characteristic of the test circuit selected is suitably effected by comparison of this test circuit value with a desired or predicted value for the circuit under test. The desired value is, of course, a known quantity from the design data corresponding to the equipment under test. The electrical characteristic of interest may be simple or complex impedance value or may be a steady state or transient voltage or current value depending upon the nature of the equipment. Any of these characteristics or combinations of such characteristics may be tested by the use of an appropriate predictor unit 28 having active or passive networks for developing the desired characteristic.

In the illustrative embodiment of the invention, the predictor unit 28 is a resistive network for developing any desired value of resistance for connection with the comparator circuit 24. The desired value of resistance is defined by the binary information on the punched tape 40 in row 4, columns 3, 4, 5, and 6; row 5, columns 1 through 6; and row 6, columns 1 and 2, of the information group. This binary information, corresponding to electron devices $a$R, $b$R, and $c$R defines the range of resistance value and this information is supplied to the digital and binary relay 26. The binary information corresponding to the electron devices $a$D, $b$D, $c$D . . . $i$D defines the digital value of resistance within the selected range and is also supplied to the digital and binary relay 26. The digital and binary relay 26, in turn, controls a digital resistor which will be described presently.

The digital resistor comprises a series connection of a multiplicity of resistors $z1, z2, z3 \ldots z23$. These resistors are related in value to each other in accordance with a geometric progression in which each succeeding resistor has a resistance value twice as great as the preceding resistor. This relationship also appears in the expression for the total resistance of the series of $n$ resistors as follows:

$$\text{The total resistance} = \sum_{x=n}^{n=x} 2^x = 2^0 + 2^1 + 2^2 + 2^3 + \ldots + 2^n$$

wherein, each term of the summation represents the value of the corresponding resistor. With this combination of digital elements, any value of resistance between the value of the smallest resistor and twice the value of the largest resistor may be obtained with a maximum accuracy of the value of the smallest resistor by selectively combining the resistors. Consequently, the total series connection of resistors may be subdivided to form successive ranges of resistance values. Thus, a first range may utilize resistors $z1-z9$ in which case the total range of resistance values is given by the expression $$\sum_{x=0}^{x=9} 2^x$$

a second range may utilize resistors $Z3$ through $Z11$ for a range $$\sum_{x=3}^{x=11} 2^x$$

and so on for eight different ranges. To effect the automatic selection of the any desired range of resistance values and any combination of resistors within the selected range, the range and digital relay 26 is utilized.

The desired value of resistance is automatically developed between the output terminals 146 of the predictor unit 28 by the operation of the digital and range relay 26 in accordance with the binary information recorded on the punched tape 40. The relay 26 includes the range relays 140, 142, and 144 connected respectively to the electron devices $a$R, $b$R, and $c$R of the data translation unit 14. The range relay 140 actuates switches 148 and 148' each having a movable contact connected with the output terminals 146 and movable between respective front and back fixed contacts. The front and back contacts of the switch 148 are connected respectively to the movable contacts of switches 152 and 150 and the front and back contacts of the switch 148' are connected respectively to the movable contacts of the switches 152' and 150'. The switches 150, 150' and 152, 152' are connected for actuation with the coil 142 for concurrent displacement between respective front and back contacts. The front and back contacts of switch 150 are connected to the movable contacts of switches 156 and 154 respectively and the front and back contacts of switch 152 are connected to the movable contacts of switches 160 and 162 respectively. Likewise, the front and back contacts of switch 150' are connected respectively to the movable contacts of switches 156' and 154' and the front and back contacts of switch 152' are connected respectively to the movable contacts of switches 158' and 160'. The movable contacts of switches 154 and 154', 156 and 156' 158 and 158', and 160 and 160' are connected for concurrent actuation by the relay 144 between the respective front and back contacts which latter group of contacts constitute the terminals of the range relay. The contacts 176 and 176' are connected across the series of resistors $z1-z9$ which comprise the resistors for the low resistance range. The contacts 174 and 174' are connected across the series of resistors $z3-z11$ which constitute the second range of resistance values. Similarly, the succeeding contacts in pairs 172 and 172', 170 and 170', 168 and 168', 166 and 166', 164 and 164' and 162 and 162' are connected across corresponding resistor groups thus providing 8 different ranges of resistance values which may be selected by different combinations of the condition of relays 140, 142, and 144.

The selection of the digital value of the resistance within any given range is accomplished by the actuation of the digital relays 178, 180, 182 . . . 194 in accordance with the binary information recorded on the punched tape 40. The relays 178, 180, 182 . . . 194 are connected respectively with the electron devices $a$D, $b$D, $c$D . . . $i$D for energization thereby. To permit any one of the resistors included within a given range to be selected to contribute to the resistance value appearing between the output terminals 146, each resistor $z1$ through $z23$ is provided with a corresponding short-circuiting switch $s1$ through $s23$. Each of the short-circuiting switches is normally closed and thus in the absence of energization of the corresponding relay coil the corresponding resistor is effectively removed from the circuit. Thus, one relay is connected for actuation of the switch corresponding to each different resistor within a given range. For the first range, relays $a$D through $i$D are connected respectively with switches $s1$ through $s9$. For the second range, relays $a$D through $i$D are connected respectively with switches $s3$ through $s11$, for the third range, relays $a$D through $i$D are connected respectively with switches $s5$ through $s13$, and so on. It will be apparent that the operation of a shorting-switch of a resistor not included within the selected range will have no effect on the total resistance appearing between the output terminals 146. By this arrangement of the digital resistor, any desired value of resistance may be selected as a standard for comparison with the resistance value of the test circuit. For this purpose, the output terminals 146 of the predictor unit 28 are connected over conductors N to the reference input terminals of the comparator circuit 24.

The comparator circuit 24 may be of any conventional circuit configuration such as a bridge network in which the output terminals 146 of the predictor unit are connected in one arm of the bridge and the output terminals S and S' are connected in an opposite arm of the bridge. Accordingly, the comparator circuit will develop an output voltage having an amplitude and phase or polarity corresponding to the extent and direction of disagreement between the predicted or desired value of resistance and the actual value of resistance of the test circuit.

Preferably, provision is made for specifying in each test procedure the tolerances corresponding to the electrical characteristic being tested. For this purpose, the punched tape includes at row 4, columns 1 and 2 binary information defining the acceptable tolerances and this information is translated to the corresponding electron devices aT and bT in the data translation unit 14. This data is transmitted over conductor group L to the binary relay 30 and thence through the conductor group K to the tolerance control unit 32. The tolerance control unit may effect regulation of the output voltage of the comparator circuit 24 by a suitable attenuator or the like, in accordance with the tolerance data on punched tape 40. This output voltage is supplied by conductor W to the reject relay 34. Upon the occurrence of a predetermined value of the comparator circuit output voltage, the reject relay 34 is operated and through suitable coupling with the punched tape mechanism 12, disables the tape drive mechanism or otherwise signifies to the operator that the circuit under test is not acceptable.

Considering now a typical cycle of operation of the test apparatus, it may be assumed that the electronic equipment 10 being tested has 512 different test points. Each of these test points is connected to a different one of the test circuit terminals 1a, 1b, 1c . . . 2a, 2b, 2c . . . 3a, 3b, 3c . . . etc., through conductor group T to the three coordinate array 22. Likewise, each of these test points is connected to a different one of the test circuit terminals 1a', 1b', 1c' . . . 2a', 2b', 2c' . . . 3a', 3b', 3c' . . . etc. (not shown), through conductor group T' to the three coordinate array 22'. It may be further assumed that the test circuit extending between test circuit terminal 2b and 1c' has a design resistance value of 644 ohms plus or minus 5%. This data is defined by the binary information group 44 on the punched tape 40. Accordingly, the tape is advanced by the tape drive mechanism to present rows 1 through 6 of the recorded data to the reader contacts 48. When row 1 is presented the stepping switch movable contact R will engage fixed contact R1 and the bias voltage will be removed from the control electrode 60 of each of the electron devices in row 1. The reader contacts C3 will be closed and accordingly the bias voltage on control electrode 56 in all of the electron devices in column 3 will be removed. Therefore, electron device cX will be rendered conductive. In a similar manner when the succeeding rows are presented to the reader contacts, the electron devices aZ, cZ', bZ, cR, bT, bD, gD, and iD will be rendered conductive. Accordingly, all of the test data is transferred from the punched tape to the data translation unit 14 and stored therein for the duration of the test. The conduction of electron device cX causes energization of the X coordinate relay 70 and consequently the movable contacts of switches 78, 80, 82, and 84 are displaced into engagement with the front contacts. Since none of the electron devices aY, bY, and cY were rendered conductive the corresponding Y coordinate relays 86, 88, and 90 remain de-energized. Thus the switches of binary relay 18 remain in the position shown. Accordingly, a circuit is completed from one terminal of the voltage source 132 through the switches 92, 96, and 98 to terminal Y1 and thence to the upper terminal of the relay 130 in the X2—Y1 position. This circuit is completed from the lower terminal of this relay through the switches 84, 76, and 72 to the other terminal of the voltage source 132. Accordingly, relay in the position X2—Y1 is energized. At the same time the conduction of electron devices aZ and bZ energizes Z-coordinate relays 106 and 108 causing the movable contacts of switches 112, 114, and 116 to be displaced from the back contacts to the front contacts. This completes a circuit from the test circuit terminal 2b through the switch in the X2—Y1—Z7 position to the terminal Z7 and thence through switches 124, 116, and 112. From the movable contact of switch 112 the circuit is completed through conductor S to one test circuit terminal of comparator circuit 24. In a similar manner, the X, Y, and Z-coordinate binary relays 16', 18' and 20' together with the three coordinate array 22' operate in response to the conduction of electron device cZ' to connect the other test circuit terminal 1c' to the other test circuit input terminal of the comparator circuit 24. To select the desired value of resistance in the predictor unit, the range relay 144 is energized in response to the conduction of electron devices cR. Accordingly, switches 154' through 160' and switches 154 through 160 are displaced into engagement with the front contacts. Thus, a circuit is completed from the upper terminal 146 through switches 148', 150', and 174' and thence through resistors Z3 through Z11 from which the circuit is completed through switches 174, 150, and 148 to the lower terminal 146. At the same time, however, conduction of the electron devices bD, gD, and iD causes digital relays 180, 190, and 194 to be energized. Accordingly, short-circuiting switches s8, s3, and s11 are opened. Therefore, only resistors Z8, Z3, and Z10 are effectively included between terminals 146 and present a total resistance of 644 ohms. The predictor unit terminals 146 are connected through conductors N to the reference circuit terminals of the comparator circuit 24. Simultaneously, the conduction of electron devices aT and bT cause actuation of the binary relay 30 to operate the tolerance control 32. The comparator circuit 24 responds to the value of the test circuit resistance and the predictor unit resistance to develop an output voltage corresponding to the disagreement of the two resistance values as modified by the tolerance control. Assuming that the output voltage of the comparator circuit exceeds the predetermined value required to operate the reject relay 24, the tape advance will be terminated to signify that the test circuit is not acceptable. Assuming, that the output voltage of the comparator circuit is less than the predetermined value, the tape drive mechanism will advance the tape to the succeeding information group for the performance of the succeeding test in accordance with the recorded test data.

Although the description of this invention has been given with respect to a particular embodiment, it is not to be construed in a limiting sense. Many variations and modifications within the spirit and scope of the invention will now occur to those skilled in the art. For a definition of the invention, reference is made to the appended claims.

I claim:

1. Test apparatus for electrical systems having plural test points, said apparatus comprising a binary information medium defining the test data for the system to be tested, a binary information reader operatively connected to the medium for translating the binary information into electrical signals, binary information storage circuit connected with said binary information reader and including a matrix of electron devices having a number of rows and columns corresponding to that of the binary information medium and adapted to be rendered conductive selectively in accordance with the binary information recorded on said medium, a binary test circuit selector connected with said storage circuit and responsive to said devices, said test circuit selector having a pair of output terminals and plurality of input terminals selectively connectible to the output terminals in accordance with said binary information, said input terminals being adapted for connection to the test points of the system to be tested, a comparator circuit having one pair of input terminals connected to the output terminals of said test circuit selector, a predictor circuit having a plurality of terminals for providing an electrical characteristic corresponding with the desired characteristic of the selected test circuit, a binary reference circuit selector connected with said storage circuit and responsive to said devices, said reference circuit selector having plural input terminals connected with the terminals of said predictor circuit and selectably connectible with a pair of output terminals in accordance with said binary information, the output terminals of the reference circuit selector being connected to another pair of input terminals of said comparator circuit terminals, and means connected with the comparator circuit for signifying disagreement of the electrical characteristics of said test circuit and said reference circuit.

2. A binary information storage unit comprising, a record medium including binary digits disposed in an array of columns and rows, an array of electron devices each of which corresponds to one of said digits and includes output electrodes and first and second control electrodes, a supply voltage source connected across all of said output electrodes and a bias voltage source connected to all of said control electrodes to normally maintain each of said devices in one state of conduction, reader means coacting with said record medium and responsive to said binary digits, drive means advancing said record medium row by row relative to said reader means, means operable in synchronism with said drive means for changing the bias voltage on the control electrode of all of said devices corresponding to a given row, said reader means being operative to change the bias voltage on the control electrodes of all of said devices corresponding to a given column in accordance with the character of the binary digit in that column for the given row, the coincidence of a bias voltage change on the first and second electrodes of a given device being effective to produce a different state of conduction in that device.

3. A device for transferring and storing binary information from a punched tape comprising an array of electron devices and having a number of columns and rows corresponding to that of the punched tape, each of said electron devices having a pair of output electrodes and first and second control electrodes, all of the first control electrodes of the electron devices in the same column being connected together to form a first control circuit for each column, all of the second control electrodes of the electron devices in the same row being connected together to form a second control circuit for each row, a supply voltage source connected across the output electrodes of all of said electron devices, a bias voltage source connected to each of said control circuits to maintain said electron devices non-conductive, a different reader contact operable by said punched tape and connected with the control circuit of each column to selectively remove the bias voltage from the first control electrodes in accordance with the binary information recorded on the tape, a stepping switch operable in synchronism with the tape movement and having a contact connected with the control circuit of each row to sequentially remove the bias from the second control electrodes whereby the electron devices are rendered conductive selectively in accordance with the binary information recorded on said tape.

4. A three coordinate circuit selector comprising a plurality of relays arranged electrically in rows and columns defining X and Y coordinate positions, plural switches connected with each relay and defining Z-coordinate positions, the relays in a given column being provided with a common connection of one terminal of each relay to form an X-coordinate terminal for each column, the relays in a given row being provided with a common connection of the other terminal of each relay to form a Y-coordinate terminal for each row, the corresponding switches of all relays being provided with a common connection of one contact of each switch to form a Z-coordinate terminal for each layer of switches, multiple circuit terminals being afforded by the other contact of each switch, switching means for selectably connecting one of said X-coordinate terminals and one of said Y-coordinate terminals across a voltage source whereby the corresponding one of said relays is energized, and switching means for selectably connecting one of said Z-coordinate terminals to a utilization device whereby one of said circuit terminals is individually connected to said utilization device.

5. A circuit selector comprising $2^{(m+n)}$ relays arranged electrically in $2^n$ rows and $2^m$ columns defining X and Y coordinate positions, $2^p$ switches connected with each relay and defining Z-coordinate positions, the relays in a given column being provided with a common connection of one terminal of each relay to form an X-coordinate terminal for each column, the relays in a given row being provided with a common connection of the other terminal of each relay to form a Y-coordinate terminal for each row, the corresponding switches of all relays being provided with a common connection of one contact of each switch to form a Z-coordinate terminal for each layer of switches, $2^{(m+n+p)}$ circuit terminals being afforded by the other contacts of said switches, an X-coordinate binary switching system including $n$ banks of switches with an input switch connectible with any one of $2^n$ output switches each connected to an X-coordinate terminal, and a relay for actuating each of said $n$ banks of switches, a Y-coordinate binary switching system including $m$ banks of switches with an input switch connectible to any one of $2^m$ output switches each connected to a Y-coordinate terminal, and a relay for actuating each of the last-mentioned banks of switches, a voltage source connected between said input switches whereby the relay corresponding to the X and Y coordinate terminals selected by the binary switching systems is energized, a Z-coordinate binary switching system including $p$ banks of switches with an input switch connectible to any one of $2^p$ output switches each connected to a Z-coordinate terminal, and a relay for actuating each of the last-mentioned banks of switches whereby one of said $2^{(m+n+p)}$ circuit terminals is connected to the input switch of the Z-coordinate binary relay, where $m$, $n$, and $p$ are any integers.

References Cited in the file of this patent

UNITED STATES PATENTS 2,329,491    Sulzer _____ Sept. 14, 1943

OTHER REFERENCES

Rymsha: "Radio-Electronics," July 1956, pp. 55–57.

UNITED STATES PATENT OFFICE
CERTIFICATE OF CORRECTION

Patent No. 2,996,666                                                   August 15, 1961

Shields Patrick Baker

It is hereby certified that error appears in the above numbered patent requiring correction and that the said Letters Patent should read as corrected below.

Column 1, line 24, for "In the manufacture and operational maintenance of" read -- In previously known test apparatus it is necessary to --; column 7, line 46, for that portion of the formula reading $$\sum_{x=n}^{n=x} \quad \text{read} \quad \sum_{x=0}^{x=n}$$

Signed and sealed this 10th day of April 1962.

(SEAL)
Attest:

ERNEST W. SWIDER                                          DAVID L. LADD
Attesting Officer                                       Commissioner of Patents